(12) United States Patent
Masuda et al.

(10) Patent No.: US 11,199,140 B2
(45) Date of Patent: Dec. 14, 2021

(54) ENGINE

(71) Applicant: IHI CORPORATION, Tokyo (JP)

(72) Inventors: Yutaka Masuda, Tokyo (JP); Yoshiyuki Umemoto, Hyogo (JP); Ryoichi Kanehira, Hyogo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/891,969

(22) Filed: Jun. 3, 2020

(65) Prior Publication Data

US 2020/0291874 A1 Sep. 17, 2020

Related U.S. Application Data

(63) Continuation of application No. PCT/JP2019/010587, filed on Mar. 14, 2019.

(30) Foreign Application Priority Data

Mar. 16, 2018 (JP) .............................. JP2018-050005

(51) Int. Cl.
*F02D 15/04* (2006.01)
*B60Q 9/00* (2006.01)
(Continued)

(52) U.S. Cl.
CPC .............. *F02D 15/04* (2013.01); *B60Q 9/00* (2013.01); *F02B 75/044* (2013.01); *F02D 35/02* (2013.01);
(Continued)

(58) Field of Classification Search
CPC .......... F02F 1/004; F02D 35/02; F02D 15/04; F02B 75/044; B60Q 9/00
See application file for complete search history.

(56) References Cited

U.S. PATENT DOCUMENTS

2009/0188471 A1 7/2009 Jaquet
2013/0167797 A1* 7/2013 Svrcek ........................ F16J 1/09
123/193.4
(Continued)

FOREIGN PATENT DOCUMENTS

CN 101421498 A 4/2009
CN 106414951 A 2/2017
(Continued)

OTHER PUBLICATIONS

International Search Report issued in Application No. PCT/JP2019/010587, dated Jun. 4, 2019, 3 pages.
(Continued)

*Primary Examiner* — Kevin A Lathers
(74) *Attorney, Agent, or Firm* — Rothwell, Figg, Ernst and Manbeck, P.C.

(57) ABSTRACT

Provided is an engine, including: a cylinder including a cylinder liner; a piston provided inside the cylinder liner; a piston ring provided on the piston; a contact detector configured to detect a contact between a step formed in an inner peripheral surface of the cylinder liner and the piston ring; and a compression ratio controller configured to control a top dead center position of the piston so that the piston ring at the top dead center position is located on a combustion chamber side with respect to the step when the contact is detected.

12 Claims, 7 Drawing Sheets

(51) Int. Cl.
   *F02B 75/04*   (2006.01)
   *F02D 35/02*   (2006.01)
   *F02F 1/00*    (2006.01)
   *F02F 3/00*    (2006.01)
   *F16J 9/00*    (2006.01)

(52) U.S. Cl.
   CPC ............ *F02F 1/004* (2013.01); *F02F 3/0015* (2013.01); *F16J 9/00* (2013.01)

(56) References Cited

U.S. PATENT DOCUMENTS

| | | |
|---|---|---|
| 2016/0319739 A1 | 11/2016 | Yamada |
| 2016/0319768 A1 | 11/2016 | Suzuki |

FOREIGN PATENT DOCUMENTS

| | | | |
|---|---|---|---|
| EP | 2687707 A2 | | 1/2014 |
| JP | S62-079103 A | | 4/1987 |
| JP | S62-79103 U | | 5/1987 |
| JP | S6312837 A | | 1/1988 |
| JP | 06081623 A | * | 3/1994 |
| JP | 2005-180303 A | | 7/2005 |
| JP | 2007-247545 A | | 9/2007 |
| JP | 2008-190963 A | | 8/2008 |
| JP | 2009-115033 A | | 5/2009 |
| JP | 2009115033 A | * | 5/2009 |
| JP | 2010-043544 A | | 2/2010 |
| JP | 2011-220204 A | | 11/2011 |
| JP | 2012-002655 A | | 1/2012 |
| JP | 2013-068157 A | | 4/2013 |
| JP | 2014-020375 A | | 2/2014 |
| JP | 2015-190392 A | | 11/2015 |
| KR | 10-2016-0090393 A | | 7/2016 |
| KR | 10-2016-0129742 A | | 11/2016 |

OTHER PUBLICATIONS

Decision to Grant issued in KR Patent Application No. 10-2020-7021326, dated Oct. 20, 2021 (2 pages, non-English).

Combined Office Action and International Search Report issued in CN Patent Application No. 201980019828.2, dated Oct. 18, 2021, 7 pages, non-English.

* cited by examiner

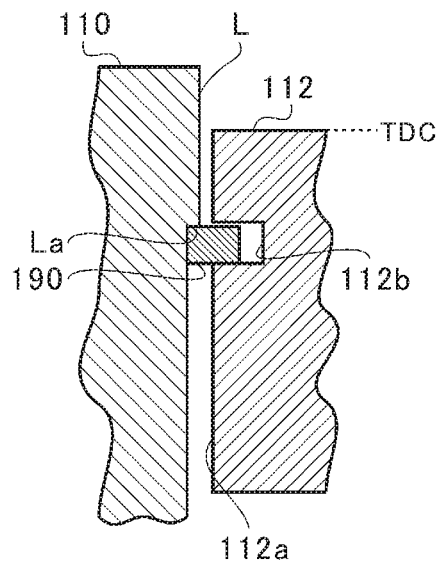
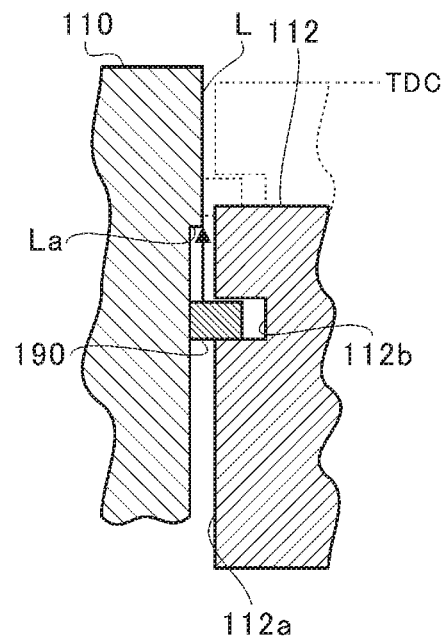
FIG.4(a)       FIG.4(b)
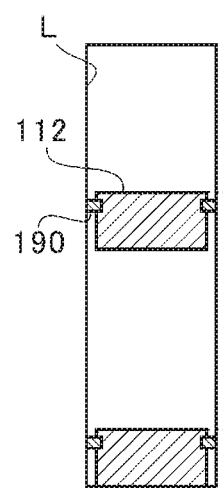
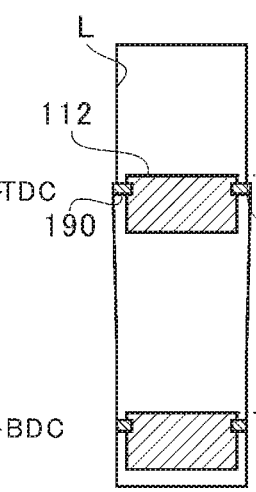
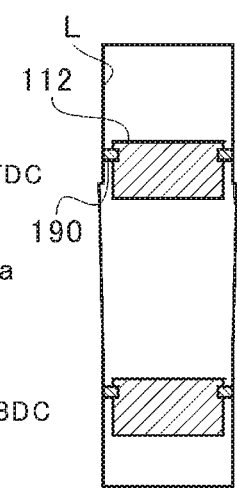
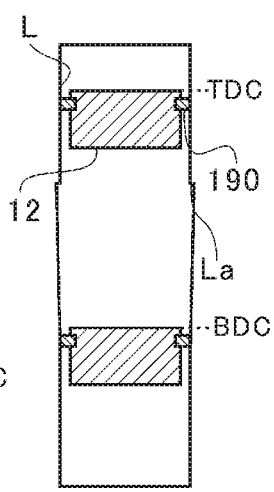
FIG.5(a)   FIG.5(b)   FIG.5(c)   FIG.5(d)

ENGINE

CROSS REFERENCE TO RELATED APPLICATIONS

This application is a continuation application of International Application No. PCT/JP2019/010587, filed on Mar. 14, 2019, which claims priority to Japanese Patent Application No. 2018-050005, filed on Mar. 16, 2018, the entire contents of which are incorporated by reference herein.

BACKGROUND ART

Technical Field

The present disclosure relates to an engine. This application claims the benefit of priority to Japanese Patent Application No. 2018-050005 filed on Mar. 16, 2018, and contents thereof are incorporated herein.

Related Art

An engine of a crosshead type is sometimes used as a marine engine. For example, in an engine described in Patent Literature 1, a hydraulic piston is arranged in a crosshead, and actuation of the hydraulic piston by hydraulic pressure causes a top dead center position of the piston to move. As a result, a geometrical compression ratio of the engine can be changed.

CITATION LIST

Patent Literature

Patent Literature 1: JP 2014-020375 A

SUMMARY

Technical Problem

Incidentally, in an engine, a piston ring slides on a cylinder inner peripheral surface. Therefore, the cylinder inner peripheral surface is worn by the piston ring up to a position of the piston ring given when the piston reaches the top dead center position. As a result, a step may be formed in the cylinder inner peripheral surface after a use for a long period. After that, when the top dead center position of the piston moves toward a high compression ratio side, the piston ring comes into contact with the step. When the step is excessively large, an impact by the contact is large. This phenomenon occurs not only in the marine engine and the engine of the crosshead type but also in other engines such as an engine for a vehicle.

In view of the above-mentioned problem, the present disclosure has an object to provide an engine capable of suppressing formation of a step caused by wear of a cylinder inner peripheral surface.

Solution to Problem

In order to solve the above-mentioned problem, according to one mode of the present disclosure, there is provided an engine, including: a cylinder including a cylinder liner; a piston provided inside the cylinder liner; a piston ring provided on the piston; a detector configured to output a detection signal in accordance with a contact between a step formed in an inner peripheral surface of the cylinder liner and the piston ring; and a compression ratio controller configured to control a top dead center position or a bottom dead center position of the piston in accordance with the detection signal to a position at which the piston ring is located beyond the step.

In order to solve the above-mentioned problem, according to one mode of the present disclosure, there is provided an engine, including: a cylinder including a cylinder liner; a piston provided inside the cylinder liner; a piston ring provided on the piston; a detector configured to output a detection signal in accordance with a contact between a step formed in an inner peripheral surface of the cylinder liner and the piston ring; and a compression ratio controller configured to control a top dead center position or a bottom dead center position of the piston in accordance with the detection signal to a position at which the piston ring is located not beyond the step.

In order to solve the above-mentioned problem, according to one mode of the present disclosure, there is provided an engine, including: a cylinder including a cylinder liner; a piston provided inside the cylinder liner; a piston ring provided on the piston; a compression ratio controller configured to control a top dead center position or a bottom dead center position of the piston; a detector configured to output a detection signal in accordance with a contact between a step formed in an inner peripheral surface of the cylinder liner and the piston ring; and a notification unit configured to execute notification in accordance with the detection signal.

In order to solve the above-mentioned problem, according to one mode of the present disclosure, there is provided an engine, including: a cylinder including a cylinder liner; a piston provided inside the cylinder liner; a piston ring provided on the piston; a compression ratio controller configured to control a top dead center position or a bottom dead center position of the piston; a detector configured to output a detection signal in accordance with a contact between a step formed in an inner peripheral surface of the cylinder liner and the piston ring; and an output controller configured to reduce an engine output in accordance with the detection signal.

The engine may include a hydraulic chamber provided in any one of the piston, a piston pin, and a crosshead, wherein the detector may be configured to detect a hydraulic pressure change in the hydraulic chamber.

The detector may be configured to detect an amplitude of vibration of the cylinder liner.

The compression ratio controller may be configured to execute step detection processing of moving the top dead center position of the piston toward a side opposite to the bottom dead center position, or moving the bottom dead center position of the piston toward a side opposite to the top dead center position, at a predetermined timing.

Effects of Disclosure

According to the engine of the present disclosure, it is possible to suppress formation of a step caused by wear of a cylinder inner peripheral surface.

BRIEF DESCRIPTION OF DRAWINGS

FIG. 4(a) and FIG. 4(b) are extracted views for illustrating a cylinder and a vicinity of a piston.

FIG. 5(a), FIG. 5(b), FIG. 5(c), and FIG. 5(d) are views for exemplifying a top dead center position and a bottom dead center position of the piston.

DESCRIPTION OF EMBODIMENTS

Figure 1:
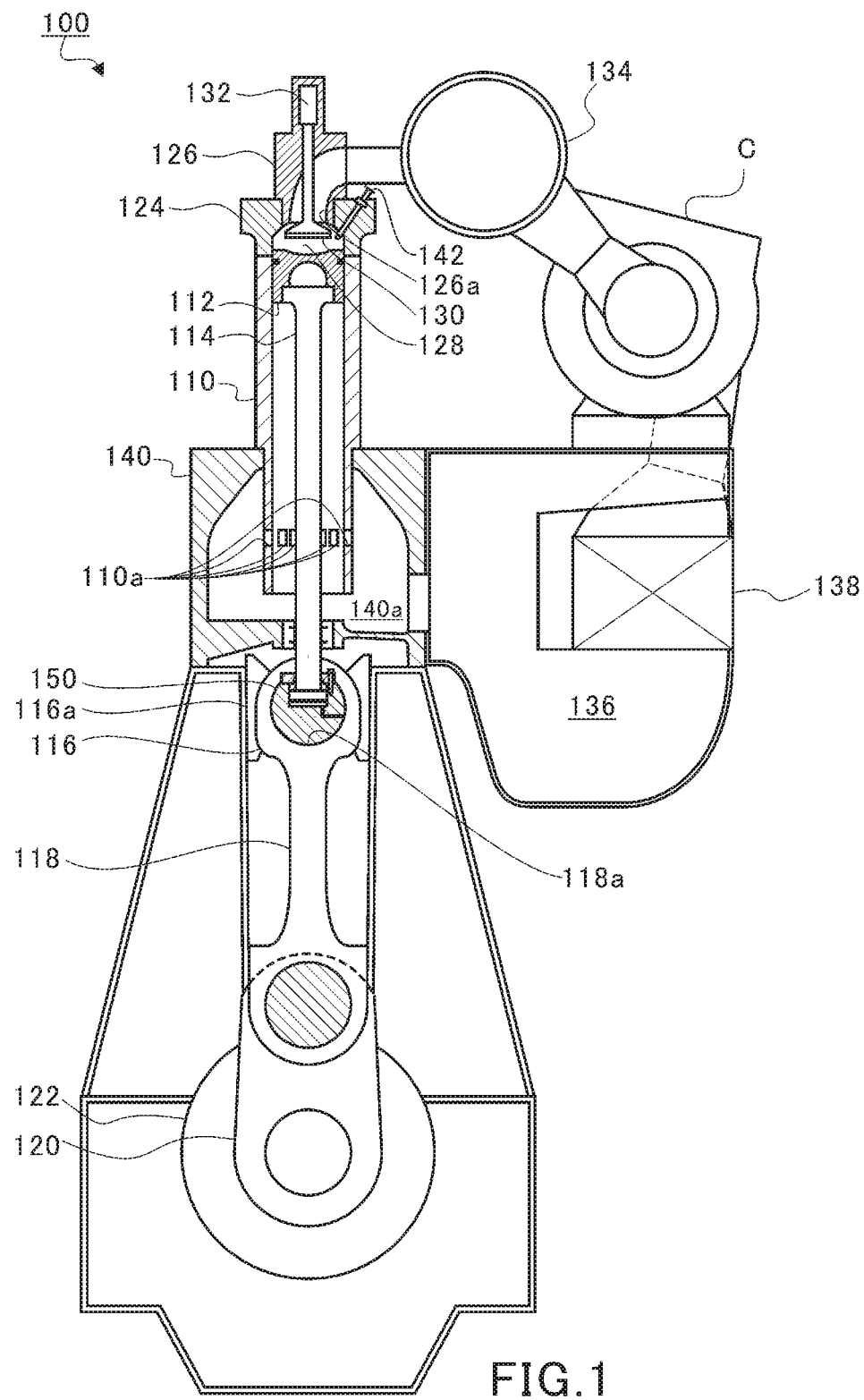
FIG. 1 is an explanatory view for illustrating an overall configuration of an engine.

Now, with reference to the attached drawings, an embodiment of the present disclosure is described in detail. The dimensions, materials, and other specific numerical values represented in the embodiment are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is an explanatory view for illustrating an overall configuration of an engine 100. As illustrated in FIG. 1, the engine 100 includes a cylinder 110, a piston 112, a piston rod 114, a crosshead 116, a connecting rod 118, a crankshaft 120, a flywheel 122, a cylinder cover 124, an exhaust valve cage 126, a combustion chamber 128, an exhaust valve 130, an exhaust valve drive device 132, an exhaust pipe 134, a scavenge reservoir 136, a cooler 138, a cylinder jacket 140, and a fuel injection valve 142.

The piston 112 is provided inside the cylinder 110. The piston 112 reciprocates inside the cylinder 110. One end of the piston rod 114 is attached to the piston 112. A crosshead pin 150 of the crosshead 116 is coupled to another end of the piston rod 114. The crosshead 116 reciprocates together with the piston 112. A movement of the crosshead 116 in a right-and-left direction (direction perpendicular to a stroke direction of the piston 112) in FIG. 1 is regulated by a guide shoe 116a.

The crosshead pin 150 is pivotally supported by a crosshead bearing 118a provided at one end of the connecting rod 118. The crosshead pin 150 supports one end of the connecting rod 118. The another end of the piston rod 114 and the one end of the connecting rod 118 are connected to each other through an intermediation of the crosshead 116.

Another end of the connecting rod 118 is coupled to the crankshaft 120. The crankshaft 120 is rotatable with respect to the connecting rod 118. When the crosshead 116 reciprocates along with the reciprocation of the piston 112, the crankshaft 120 rotates.

The flywheel 122 is mounted to the crankshaft 120. Rotations of the crankshaft 120 and the like are stabilized by inertia of the flywheel 122. The cylinder cover 124 is provided at a top end of the cylinder 110. The exhaust valve cage 126 is inserted through the cylinder cover 124.

One end of the exhaust valve cage 126 faces the piston 112. An exhaust port 126a is opened in the one end of the exhaust valve cage 126. The exhaust port 126a is opened to the combustion chamber 128. The combustion chamber 128 is formed inside the cylinder 110 so as to be surrounded by the cylinder cover 124, the cylinder 110, and the piston 112.

A valve body of the exhaust valve 130 is located in the combustion chamber 128. An exhaust valve drive device 132 is attached to a rod portion of the exhaust valve 130. The exhaust valve drive device 132 is arranged in the exhaust valve cage 126. The exhaust valve drive device 132 moves the exhaust valve 130 in the stroke direction of the piston 112.

When the exhaust valve 130 moves toward the piston 112 side to open, exhaust gas generated in the cylinder 110 after combustion is discharged from the exhaust port 126a. After the exhaust gas is discharged, the exhaust valve 130 moves toward the exhaust valve cage 126 side to close the exhaust port 126a.

An exhaust pipe 134 is attached to the exhaust valve cage 126 and a supercharger C. An inside of the exhaust pipe 134 communicates with the exhaust port 126a and a turbine of the supercharger C. The exhaust gas discharged from the exhaust port 126a is supplied to the turbine (not shown) of the supercharger C through the exhaust pipe 134, and is then discharged to the outside.

Moreover, active gas is pressurized by a compressor (not shown) of the supercharger C. In this state, the active gas is, for example, air. The pressurized active gas is cooled by the cooler 138 in the scavenge reservoir 136. A bottom end of the cylinder 110 is surrounded by a cylinder jacket 140. A scavenge chamber 140a is formed inside the cylinder jacket 140. The active gas after the cooling is forcibly fed into the scavenge chamber 140a.

Scavenging ports 110a are formed on a bottom end side of the cylinder 110. The scavenging port 110a is a hole passing from an inner peripheral surface to an outer peripheral surface of the cylinder 110. A plurality of scavenging ports 110a are formed at intervals in a circumferential direction of the cylinder 110.

When the piston 112 moves toward the bottom dead center position side with respect to the scavenging ports 110a, the active gas is sucked from the scavenging ports 110a into the cylinder 110 by a pressure difference between the scavenge chamber 140a and the inside of the cylinder 110.

Moreover, a fuel injection valve 142 is provided in the cylinder cover 124. A distal end of the fuel injection valve 142 is directed toward the combustion chamber 128 side. The fuel injection valve 142 injects a liquid fuel (fuel oil) into the combustion chamber 128. The liquid fuel is combusted, and expansion pressure generated by the combustion causes the piston 112 to reciprocate.

Figure 2:
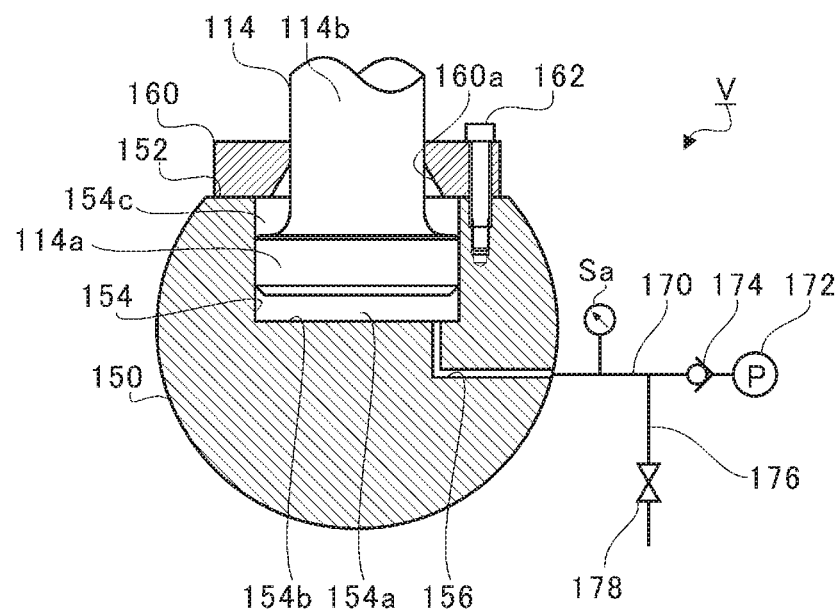
FIG. 2 is an extracted view for illustrating a coupling portion between a piston rod and a crosshead pin.

FIG. 2 is an extracted view for illustrating a coupling portion between the piston rod 114 and the crosshead pin 150. As illustrated in FIG. 2, a flat surface portion 152 is formed on an outer peripheral surface on the piston 112 side of the crosshead pin 150. The flat surface portion 152 extends in a direction substantially perpendicular to the stroke direction of the piston 112.

A pin hole 154 is formed in the crosshead pin 150. The pin hole 154 is opened in the flat surface portion 152. The pin hole 154 extends from the flat surface portion 152 toward the crankshaft 120 side (lower side in FIG. 2) along the stroke direction.

A cover member 160 is provided on the flat surface portion 152 of the crosshead pin 150. The cover member 160 is attached to the flat surface portion 152 of the crosshead pin 150 by a fastening member 162. The cover member 160 covers the pin hole 154. A cover hole 160a passing in the stroke direction is formed in the cover member 160.

The piston rod 114 includes a large-diameter portion 114a and a small-diameter portion 114b. An outer diameter of the large-diameter portion 114a is larger than an outer diameter of the small-diameter portion 114b. The large-diameter portion 114a is formed at the another end of the piston rod 114. The large-diameter portion 114a is inserted into the pin hole 154 of the crosshead pin 150. The small-diameter portion 114b is formed at the one end side of the piston rod 114 with respect to the large-diameter portion 114a. The small-diameter portion 114b is inserted into the cover hole 160a of the cover member 160.

A hydraulic chamber 154a is formed inside the pin hole 154. The pin hole 154 is partitioned by the large-diameter portion 114a in the stroke direction. The hydraulic chamber 154a is a space defined on a bottom surface 154b side of the pin hole 154 partitioned by the large-diameter portion 114a.

One end of an oil passage 156 is opened in the bottom surface 154b. Another end of the oil passage 156 is opened to an outside of the crosshead pin 150. A hydraulic pipe 170 is connected to the another end of the oil passage 156. A hydraulic pressure sensor Sa (detector) is provided on the hydraulic pipe 170. A hydraulic pressure in the hydraulic chamber 154a communicating with the hydraulic pipe 170 is detected by the hydraulic pressure sensor Sa.

A hydraulic pump 172 communicates with the hydraulic pipe 170. A check valve 174 is provided between the hydraulic pump 172 and the oil passage 156. A flow of working oil flowing from the oil passage 156 side toward the hydraulic pump 172 side is suppressed by the check valve 174. The working oil is forcibly fed into the hydraulic chamber 154a from the hydraulic pump 172 through the oil passage 156.

A branch pipe 176 is connected to the hydraulic pipe 170 between the oil passage 156 and the check valve 174. A selector valve 178 is provided to the branch pipe 176. The selector valve 178 is, for example, an electromagnetic valve. The selector valve 178 is closed during an operation of the hydraulic pump 172. When the selector valve 178 is opened while the hydraulic pump 172 is stopped, the working oil is discharged from the hydraulic chamber 154a toward the branch pipe 176 side. The selector valve 178 communicates with an oil tank (not shown) on a side opposite to the oil passage 156. The discharged working oil is retained in the oil tank. The oil tank supplies the working oil to the hydraulic pump 172.

The large-diameter portion 114a slides on an inner peripheral surface of the pin hole 154 in the stroke direction in accordance with an oil amount of the working oil in the hydraulic chamber 154a. As a result, the piston rod 114 moves in the stroke direction. The piston 112 moves together with the piston rod 114. Accordingly, the top dead center position of the piston 112 is variable.

That is, the engine 100 includes a compression ratio changing mechanism V. The compression ratio changing mechanism V includes the hydraulic chamber 154a and the large-diameter portion 114a of the piston rod 114. The compression ratio changing mechanism V moves the top dead center position of the piston 112 so that the compression ratio is changeable.

The description has been given of the case in which the one hydraulic chamber 154a is provided. However, a space 154c on the cover member 160 side of the pin hole 154 partitioned by the large-diameter portion 114a may also be a hydraulic chamber. This hydraulic chamber may be used together with the hydraulic chamber 154a or may be used individually.

Figure 3:
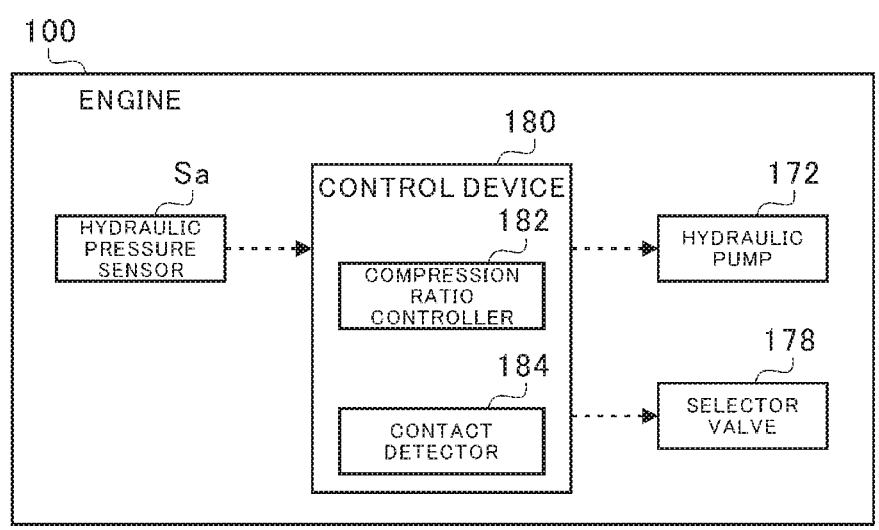
FIG. 3 is a functional block diagram for illustrating the engine.

FIG. 3 is a functional block diagram for illustrating the engine 100. In FIG. 3, a configuration relating to control for the compression ratio changing mechanism V is mainly illustrated. As illustrated in FIG. 3, the engine 100 includes a control device 180. The control device 180 is formed of, for example, an ECU (Engine Control Unit). The control device 180 is formed of a central processing unit (CPU), a ROM storing programs and the like, a RAM serving as a work area, and the like, and is configured to control the entire engine 100. Moreover, the control device 180 functions as a compression ratio controller 182 and a contact detector 184.

The compression ratio controller 182 is configured to control the hydraulic pump 172 and the selector valve 178 to move the top dead center position of the piston 112. In such a manner, the compression ratio controller 182 controls a geometrical compression ratio of the engine 100.

The contact detector 184 is configured to acquire a detection signal indicating the hydraulic pressure in the hydraulic chamber 154a from the hydraulic pressure sensor Sa. The hydraulic pressure in the hydraulic chamber 154a is described later.

FIG. 4(a) and FIG. 4(b) are extracted views for illustrating the cylinder 110 and a vicinity of the piston 112. Here, a description is given of a case in which an inner peripheral surface of the cylinder 110 forms a cylinder liner L as an example. However, the cylinder liner L may be an independent member, and may be attached to the cylinder 110. As illustrated in FIG. 4(a), the piston 112 is provided inside the cylinder liner L.

An outer peripheral groove 112b is formed in an outer peripheral surface 112a of the piston 112. A piston ring 190 is mounted in the outer peripheral groove 112b. Here, the description is given of a case in which one set of the piston ring 190 and the outer peripheral groove 112b is provided. However, one or a plurality of piston rings and outer peripheral grooves may further be provided on the bottom dead center position side with respect to the piston ring 190 and the outer peripheral groove 112b.

The piston ring 190 slides on the cylinder liner L. Therefore, the cylinder liner L is worn by the piston ring 190 up to a position of the piston ring 190 given when the piston 112 reaches the top dead center position. As a result, a step La may be formed on the inner peripheral surface of the cylinder liner L after a use for a long period in some cases. After that, when the top dead center position of the piston 112 moves toward a high compression ratio side as indicated by broken lines illustrated in FIG. 4(b), the piston ring 190 comes into contact with the step La in a compression stroke in which the piston 112 moves toward the top dead center position. When the step La is excessively large, an impact by the contact is large, and there is a risk in that the piston ring 190 and the cylinder liner L may be damaged.

FIG. 5(a), FIG. 5(b), FIG. 5(c), and FIG. 5(d) are views for exemplifying the top dead center position and the bottom dead center position of the piston 112. In FIG. 5(a), the top dead center position of the piston 112 is at a lowest compression ratio position on the lowest compression ratio side (lower side in FIG. 5(a)). In FIG. 5(d), the top dead center position of the piston 112 is at a highest compression ratio position on the highest compression ratio side (upper side in FIG. 5(d)).

In FIG. 5(b), the top dead center position of the piston 112 is at a first position between the highest compression ratio position and the lowest compression ratio position. In FIG. 5(c), the top dead center position of the piston 112 is at a second position between the highest compression ratio position and the first position.

For example, it is assumed that navigation for a long period is performed in a state in which the top dead center position of the piston 112 is at the first position. As a result, as illustrated in FIG. 5(b), the step La is formed in the cylinder liner L. The compression ratio controller 182 executes step detection processing at a predetermined timing (for example, after elapse of a predetermined navigation period). The step detection processing is processing of moving the top dead center position of the piston 112 toward the high compression ratio side (the opposite side of the bottom dead center position). That is, the compression ratio controller 182 controls the compression ratio changing mechanism V so that the top dead center position of the piston 112 is, for example, at the highest compression ratio position as illustrated in FIG. 5(d).

Here, the description is given of the case in which the compression ratio controller 182 controls the compression ratio changing mechanism V so as to attain the maximum compression ratio position in the step detection processing. However, for example, as illustrated in FIG. 5(c), the compression ratio controller 182 may control the compression ratio changing mechanism V so that the top dead center position is at the second position on the maximum compression ratio position side of the piston 112 with respect to the first position after the long navigation in the step detection processing. The second position may be located on for example, the top dead center position side of the piston 112 with respect to the first position by a thickness of the piston ring 190 in the stroke direction.

Figure 6:
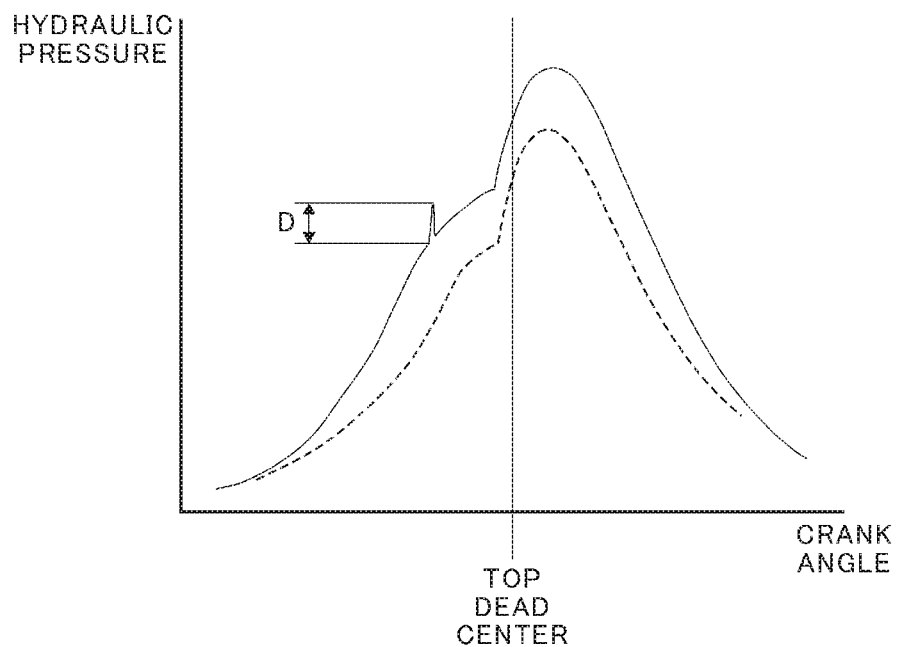
FIG. 6 is a graph for showing a relationship between a hydraulic pressure in a hydraulic chamber and a crank angle.

FIG. 6 is a graph for showing a relationship between the hydraulic pressure in the hydraulic chamber 154a and a crank angle. In FIG. 6, the hydraulic pressure in the hydraulic chamber 154a given when the top dead center position of the piston 112 is at the first position is indicated by a broken line. As described above, the hydraulic pressure in the hydraulic chamber 154a given when the step detection processing is executed after the step La is formed is indicated by a solid line.

In the step detection processing, the piston ring 190 comes into contact with the step La in the compression stroke. The hydraulic pressure in the hydraulic chamber 154a is instantaneously increased drastically (hydraulic pressure difference D) by an impact of the contact. The hydraulic pressure sensor Sa outputs a detection signal to the contact detector 184 in accordance with the contact between the step La formed on the inner peripheral surface of the cylinder liner L and the piston ring 190. The contact detector 184 monitors a hydraulic pressure change in the hydraulic chamber 154a based on the detection signal from the hydraulic pressure sensor Sa. Then, when the hydraulic pressure in the hydraulic chamber 154a increases by a value equal to or higher than a preset threshold value within a predetermined period, it is determined that the piston ring 190 has come into contact with the step La. However, the contact detector 184 may determine that the piston ring 190 has come into contact with the step La when a derivative value of the hydraulic pressure in the hydraulic chamber 154a becomes a preset derivative threshold value set.

Then, when the contact is detected, the compression ratio controller 182 controls the top dead center position of the piston 112 so that the piston ring 190 at the top dead center position of the piston 112 is located on the combustion chamber 128 side with respect to the step La (step reduction grinding processing). That is, the compression ratio controller 182 controls the compression ratio changing mechanism V so that the piston ring 190 slides toward the top dead center position side of the piston 112 with respect to the step La. In other words, the compression ratio controller 182 controls the top dead center position of the piston 112 so that the piston ring 190 slides toward the top dead center position side of the piston 112 beyond the step La (controls the top dead center position to a position beyond the step La).

In this state, the contact detector 184 identifies the position of the piston ring 190 based on, for example, the crank angle at which the contact is detected in the step detection processing. Then, the compression ratio controller 182 may control the compression ratio changing mechanism V so that the piston ring 190 slides toward the top dead center position side of the piston 112 with respect to the identified position.

In such a manner, the step La is ground by the piston ring 190 during the operation of the engine 100. Therefore, the step La deforms into a smooth tapered shape. As a result, the step La of the cylinder liner L caused by the wear is suppressed in the engine 100. For example, the step La can be suppressed by executing the step detection processing at an appropriate frequency and intentionally bringing the piston ring 190 into contact with the step La before the step La becomes excessively large.

Figure 7:
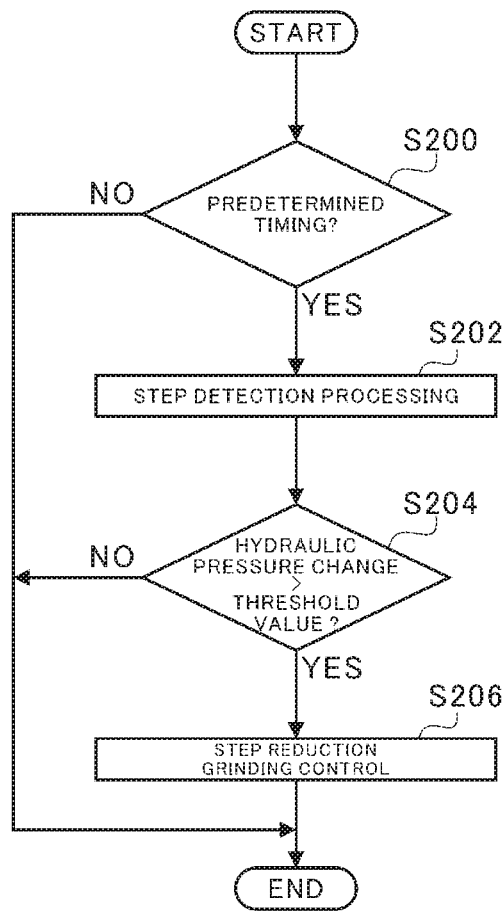
FIG. 7 is a flowchart for illustrating a flow of step suppression processing.

FIG. 7 is a flowchart for illustrating a flow of step suppression processing. The processing illustrated in FIG. 7 is repeatedly executed at a predetermined interval.

(Step S200)

The compression ratio controller 182 determines whether or not a predetermined timing is reached. When the predetermined timing is not reached, the step suppression processing is finished. When the predetermined timing is reached, the compression ratio controller 182 shifts the processing to Step S202. Examples of the predetermined timing include a start and a stop of the engine 100, a time point at which drive period of the engine 100 reaches a predetermine period, and the like.

(Step S202)

The compression ratio controller 182 executes the step detection processing.

(Step S204)

The contact detector 184 determines whether or not an increase range in the predetermined period of the hydraulic pressure in the hydraulic chamber 154a is larger than the threshold value. When the increase range of the hydraulic pressure is equal to or smaller than the threshold value, the contact detector 184 finishes the step suppression processing. When the increase range of the hydraulic pressure is larger than the threshold value, the contact detector 184 shifts the processing to Step S206.

(Step S206)

The compression ratio controller 182 executes the step reduction grinding processing.

Figure 8:
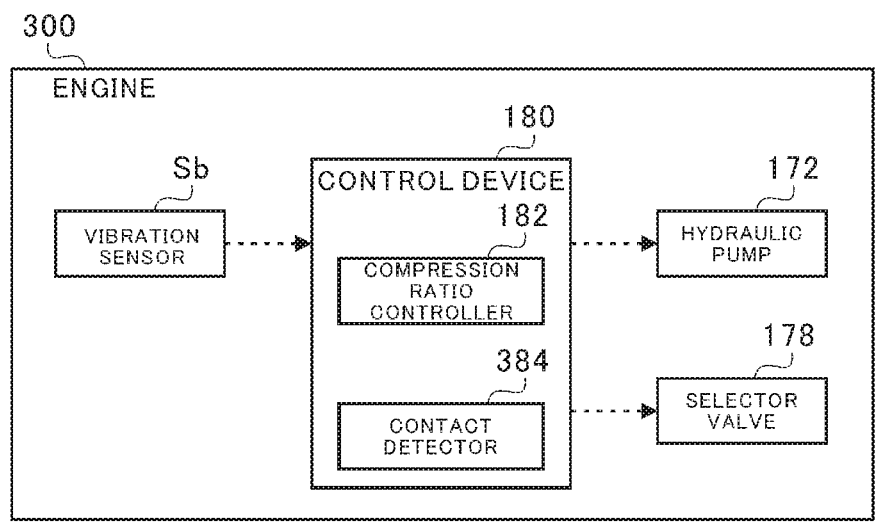
FIG. 8 is an explanatory diagram for illustrating a first modification example.

FIG. 8 is an explanatory diagram for illustrating a first modification example. As illustrated in FIG. 8, an engine 300 according to the first modification example includes a vibration sensor Sb (detector) in place of the hydraulic pressure sensor Sa. The vibration sensor Sb is formed of, for example, a vibration acceleration sensor, an AE (acoustic emission) sensor, or the like, and is configured to detect vibration of the cylinder 110. Therefore, the vibration sensor Sb is mounted to, for example, an outer peripheral surface of the cylinder 110. However, the vibration sensor Sb may be mounted to other location as long as the vibration sensor Sb can detect the vibration of the cylinder 110.

A contact detector 384 is configured to acquire a signal indicating the vibration of the cylinder 110 from the vibration sensor Sb. The vibration detector 384 identifies an amplitude based on the signal from the vibration sensor Sb. The vibration detector 384 detects the contact between the piston ring 190 and the step La based on the identified amplitude. That is, similarly to the hydraulic pressure sensor Sa, the vibration sensor Sb outputs a detection signal to the contact detector 384 in accordance with the contact between the step La formed on the inner peripheral surface of the cylinder liner L and the piston ring 190.

Figure 9:
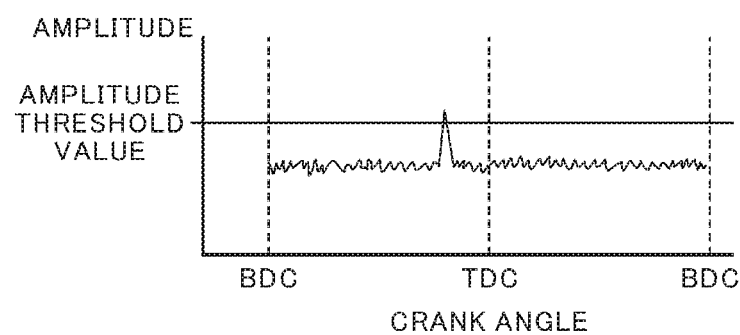
FIG. 9 is a graph for showing an example of vibration of the cylinder.

FIG. 9 is a graph for showing an example of the vibration of the cylinder 110. As shown in FIG. 9, when the piston ring 190 comes into contact with the step La, the amplitude of the vibration of the cylinder 110 instantaneously increases. When the amplitude of the vibration of the cylinder 110 exceeds an amplitude threshold value set in advance, the contact detector 384 determines that the piston ring 190 has come into contact with the step La. The contact detector 384 may detect the contact based on the amplitude of the vibration of the cylinder 110 in place of or in addition to the hydraulic pressure in the hydraulic chamber 154a described above.

Figure 10A:
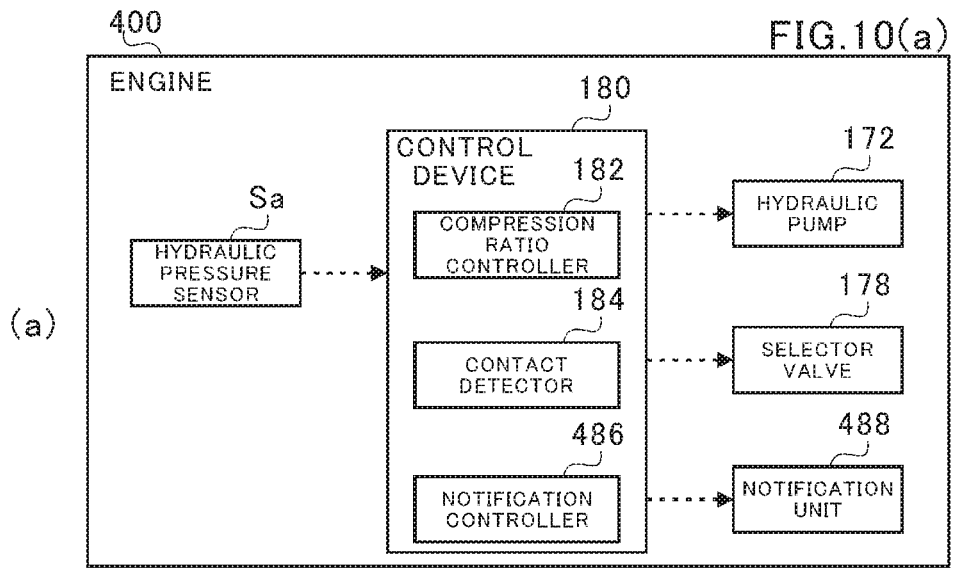
FIG. 10(a) is an explanatory diagram for illustrating a second modification example.
Figure 10B:
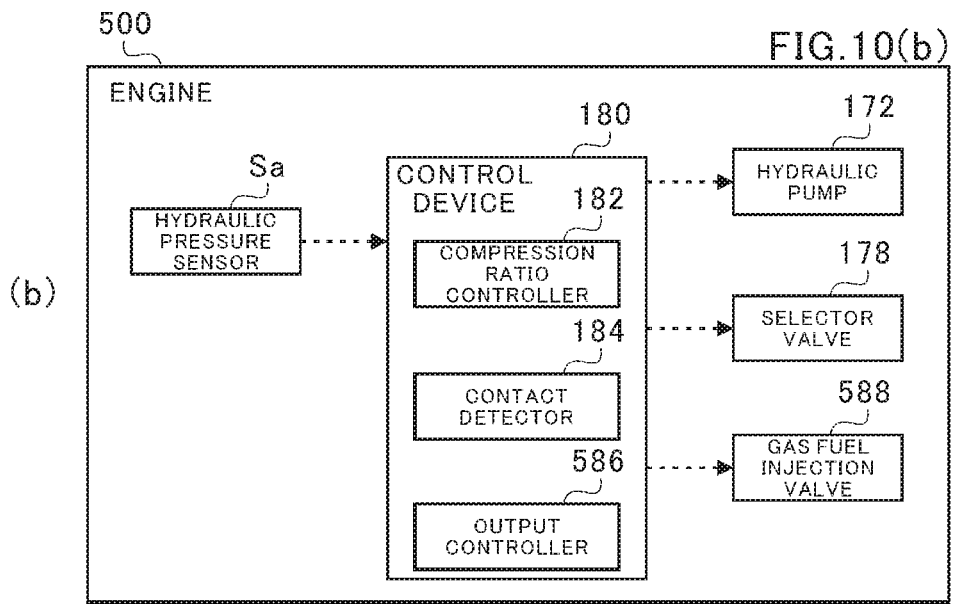
FIG. 10(b) is an explanatory diagram for illustrating a third modification example.
Figure 10C:
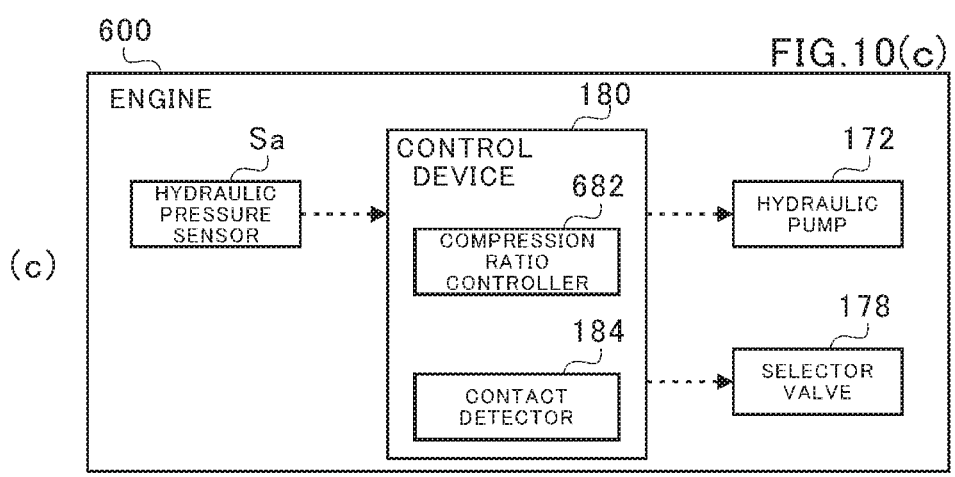
FIG. 10(c) is an explanatory diagram for illustrating a fourth modification example.

FIG. 10(a) is an explanatory diagram for illustrating a second modification example. FIG. 10(b) is an explanatory diagram for illustrating a third modification example. FIG. 10(c) is an explanatory diagram for illustrating a fourth modification example.

As illustrated in FIG. 10(a), an engine 400 according to the second modification example includes a notification controller 486 and a notification unit 488. The notification unit 488 is a display device, for example, a display. When it is determined that the piston ring 190 has come into contact with the step La, the notification controller 486 controls the notification unit 488 to make notification about the fact that the piston ring 190 has come into contact with the step La. In this state, the description is given of the case in which the notification unit 488 is a display, but the notification unit 488 may be a speaker or a warning lamp. The notification unit 488 makes a notification about the presence of the step La, and hence countermeasures against the step La can be taken.

As illustrated in FIG. 10(b), an engine 500 according to the third modification example includes an output controller 586. When it is determined that the piston ring 190 has come into contact with the step La, the output controller 586 reduces an amount of the fuel injected from a gas fuel injection valve 588. In such a manner, the output controller 586 reduces an output of the engine 500 compared with at least that immediately before the contact is detected. Therefore, the impact caused by the contact between the piston ring 190 and the step La is suppressed.

As illustrated in FIG. 10(c), an engine 600 according to the fourth modification example includes a compression ratio controller 682. The compression ratio controller 682 is configured to control the top dead center position of the piston 112 so that, when the piston 112 is at the top dead center position, the piston ring 190 is located on the bottom dead center position side of the piston 112 with respect to the step La. That is, the compression ratio controller 682 controls the compression ratio changing mechanism V so that the piston ring 190 is prevented from coming into contact with the step La. In other words, the compression ratio controller 682 controls the top dead center position of the piston 112 so that the piston ring 190 does not beyond the step La (controls the top dead center position to a position within the step La). Therefore, the impact caused by the contact between the piston ring 190 and the step La is avoided.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment and modification examples, the description is given of the engine 100, 300, 400, 500, 600 of the two-cycle type, the uniflow scavenging type, and the crosshead type as an example. However, the type of the engine is not limited to the two-cycle type, the uniflow scavenging type, and the crosshead type. It is required that the present disclosure be applied to an engine. The engine 100 is not limited to a marine engine, and may be an engine for, for example, an automobile.

Moreover, in the above-mentioned embodiment and modification examples, the description is given of the case in which the liquid fuel is used. However, for example, a gas fuel may be used. In this case, in addition to the fuel injection valve 142, a gas fuel injection valve is provided in a vicinity of the scavenging port 110a, or a portion of the cylinder 110 from the scavenging port 110a to the cylinder cover 124. The fuel gas is injected from the gas fuel injection valve, and then flows into the cylinder 110. When a small amount of the liquid fuel is injected from the fuel injection valve 142, a mixture of the fuel gas and active gas is ignited by combustion heat of the liquid fuel, and is then combusted. The fuel gas is gasified LNG, LPG (liquefied petroleum gas), light oil, heavy oil, or the like.

Moreover, the above-mentioned embodiment and modification examples may suitably be combined with one another. For example, the compression ratio controller 682 in the fourth modification example may be combined with the compression ratio controller 182 of the embodiment. In this case, for example, there are provided a first threshold value and a second threshold value larger than the first threshold value as the threshold values for the increase range of the hydraulic pressure. When the increase in the hydraulic pressure in the predetermined period exceeds the second threshold value, the compression ratio controller controls the compression ratio changing mechanism V so that the piston ring 190 is prevented from coming into contact with the step La. When the increase in hydraulic pressure in the predetermined period is equal to or smaller than the second threshold value, and exceeds the first threshold value, the compression ratio controller executes the step reduction grinding processing.

Moreover, in the above-mentioned embodiment and modification examples, the description is given of the case in which the contact detectors 184 and 384 detect the contact between the piston ring 190 and the step La in the compression stroke. However, the contact detectors 184 and 384 may detect a contact between the piston ring 190 and the step La in the expansion stroke. Moreover, when the space 154c of the pin hole 154 is used as the hydraulic chamber, the contact between the piston ring 190 and the step La may be detected in accordance with the hydraulic pressure in the hydraulic chamber of the space 154c.

Moreover, in the above-mentioned embodiment and modification examples, the description is given of the case in which the hydraulic chamber 154a is provided in the crosshead pin 150 of the crosshead 116. However, the hydraulic chamber may be provided in any of the piston 112, the piston pin, and the crosshead 116.

Moreover, in the above-mentioned embodiment and modification examples, the hydraulic pressure sensor Sa and the vibration sensor Sb are given as the examples of the detector. However, the detector is not limited to the hydraulic pressure sensor Sa and the vibration sensor Sb. The detector is only required to output the detection signal in accordance with the contact between the piston ring 190 and the step La. In any case, the contact detector 184 and 384 determine that the piston ring 190 has come into contact with the step La when the index value (corresponding to the hydraulic pressure difference D or the amplitude) identified from the detection signal exceeds the index threshold value set in advance. The compression ratio controllers 182 and 682, the notification controller 486, and the output controller 586 execute the processing in order to deal with the step La as described above.

Moreover, in the above-mentioned embodiment and modification example, the description is given of the case in which the step La is formed on the side of the top dead center position of the piston 112. However, the above-mentioned configuration is also applied to a case in which the step La is formed on the bottom dead center position side in the course of the slide of the piston ring 190 to the bottom dead center position. In this case, in the above-mentioned embodiment, the compression ratio controller 182 controls the bottom dead center position so that the piston ring 190 moves toward the bottom dead center position side beyond the step La (controls the bottom dead center position to a position beyond the step La). Moreover, in the first modification example, the contact detector 384 detects the contact between the piston ring 190 and the step on the bottom dead center side based on the amplitude of the vibration identified from the detection signal. In the above-mentioned second modification example, when the hydraulic pressure difference D identified from the detection signal in the predetermined period is equal to or larger than the threshold value, the notification controller 486 controls the notification unit 488 to make notification about the fact that the hydraulic pressure difference D identified from the detection signal in the predetermined period is equal to or larger than the threshold value. In the above-mentioned third modification example, when the hydraulic pressure difference D identified from the detection signal in the predetermined period is equal to or larger than the threshold value, the output controller 586 decreases the output of the engine 500. In the above-mentioned fourth modification example, when the hydraulic pressure difference D identified from the detection signal is equal to or larger than the threshold value, the compression ratio controller 682 controls the bottom dead center position so that the piston ring 190 does not beyond the step La (controls the piston ring 190 to a position within the step La). Moreover, in the step detection processing, the bottom dead center position of the piston 112 is moved toward the opposite side of the top dead center position.

INDUSTRIAL APPLICABILITY

The present discloser can be applied to the engine.

What is claimed is:

1. An engine, comprising:
a cylinder including a cylinder liner;
a piston provided inside the cylinder liner;
a piston ring provided on the piston;
a detector configured to output a detection signal in accordance with a contact between a step formed in an inner peripheral surface of the cylinder liner and the piston ring; and
a compression ratio controller configured to control a top dead center position or a bottom dead center position of the piston in accordance with the detection signal to a position at which the piston ring is located beyond the step.

2. The engine according to claim 1, further comprising:
a hydraulic chamber provided in any one of the piston, a piston pin, and a crosshead,
wherein the detector is configured to detect a hydraulic pressure change in the hydraulic chamber.

3. The engine according to claim 1,
wherein the detector is configured to detect an amplitude of vibration of the cylinder liner.

4. The engine according to claim 1,
wherein the compression ratio controller is configured to execute step detection processing of moving the top dead center position of the piston toward a side opposite to the bottom dead center position, or moving the bottom dead center position of the piston toward a side opposite to the top dead center position, at a predetermined timing.

5. An engine, comprising:
a cylinder including a cylinder liner;
a piston provided inside the cylinder liner;
a piston ring provided on the piston;
a detector configured to output a detection signal in accordance with a contact between a step formed in an inner peripheral surface of the cylinder liner and the piston ring; and
a compression ratio controller configured to control a top dead center position or a bottom dead center position of the piston in accordance with the detection signal to a position at which the piston ring is located not beyond the step.

6. The engine according to claim 5, further comprising:
a hydraulic chamber provided in any one of the piston, a piston pin, and a crosshead,
wherein the detector is configured to detect a hydraulic pressure change in the hydraulic chamber.

7. The engine according to claim 5,
wherein the detector is configured to detect an amplitude of vibration of the cylinder liner.

8. The engine according to claim 5,
wherein the compression ratio controller is configured to execute step detection processing of moving the top dead center position of the piston toward a side opposite to the bottom dead center position, or moving the bottom dead center position of the piston toward a side opposite to the top dead center position, at a predetermined timing.

9. An engine, comprising:
a cylinder including a cylinder liner;
a piston provided inside the cylinder liner;
a piston ring provided on the piston;
a compression ratio controller configured to control a top dead center position or a bottom dead center position of the piston;
a detector configured to output a detection signal in accordance with a contact between a step formed in an inner peripheral surface of the cylinder liner and the piston ring; and
a notification unit configured to execute notification in accordance with the detection signal.

10. The engine according to claim 9, further comprising:
a hydraulic chamber provided in any one of the piston, a piston pin, and a crosshead,
wherein the detector is configured to detect a hydraulic pressure change in the hydraulic chamber.

11. The engine according to claim 9,
wherein the detector is configured to detect an amplitude of vibration of the cylinder liner.

12. The engine according to claim 9,
wherein the compression ratio controller is configured to execute step detection processing of moving the top dead center position of the piston toward a side opposite to the bottom dead center position, or moving the bottom dead center position of the piston toward a side opposite to the top dead center position, at a predetermined timing.

* * * * *